US007330723B2

(12) United States Patent
Ishikawa et al.

(10) Patent No.: US 7,330,723 B2
(45) Date of Patent: Feb. 12, 2008

(54) COMMUNICATION PERFORMANCE CALCULATION METHOD AND COMMUNICATION PERFORMANCE CALCULATION APPARATUS IN MOBILE COMMUNICATION SYSTEM, AND BLOCKING PROBABILITY CALCULATION METHOD AND BLOCKING PROBABILITY CALCULATION APPARATUS IN COMMUNICATION SYSTEM, AND RECORDING MEDIUM

(75) Inventors: Yoshihiro Ishikawa, Kanagawa (JP); Mikio Iwamura, Kanagawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 60 days.

(21) Appl. No.: 11/324,442

(22) Filed: Jan. 3, 2006

(65) Prior Publication Data

US 2006/0111121 A1    May 25, 2006

Related U.S. Application Data

(62) Division of application No. 09/638,265, filed on Aug. 15, 2000, now Pat. No. 7,024,186.

(30) Foreign Application Priority Data

Aug. 20, 1999 (JP) ................................ 11-234799
Feb. 4, 2000 (JP) .............................. 2000-027990

(51) Int. Cl.
*H04M 1/00* (2006.01)

(52) U.S. Cl. .................... 455/423; 455/453; 455/69; 455/67.11; 370/252; 370/311; 375/343; 375/232

(58) Field of Classification Search ................ 455/453, 455/423, 67.11, 69; 370/252, 311; 375/343, 375/232

See application file for complete search history.

(56) References Cited

U.S. PATENT DOCUMENTS 5,293,640 A    3/1994    Gunmar et al. ............ 455/33.1

(Continued)

FOREIGN PATENT DOCUMENTS

EP    0750440 A2    12/1996

(Continued)

OTHER PUBLICATIONS

"Effective Bandwidth-Based Admission Control for Multiservice CDMA Cellular Networks", Jamie S. Evans and David Everitt, IEEE Transactions on Vehicular Technology, vol. 48, No. 1, Jan. 1999, p. 36-46 (*copy attached hereto as Article 1*)

(Continued)

*Primary Examiner*—Duc M. Nguyen
*Assistant Examiner*—Khawar Iqbal
(74) *Attorney, Agent, or Firm*—Workman Nydegger

(57) ABSTRACT

A subdivision data holding unit holds data of transmission power Pi and traffic intensity Ai of each subdivision. A propagation associated data holding unit holds data used for calculating received power, such as the height above the ground of antennas of the base stations and mobile stations. A received power calculating unit reads necessary data from the subdivision data holding unit and propagation associated data holding unit, and calculates the received power. A traffic calculating unit calculates the means Sm and variances Sv of the traffic at the base stations from the data calculated by the received power calculating unit. A performance calculating unit calculates the performance such as the blocking probability from the means Sm and variances Sv calculated by the traffic calculating unit and from the threshold value T provided by the threshold value generator, and outputs the results.

9 Claims, 14 Drawing Sheets

U.S. PATENT DOCUMENTS

| | | | |
|---|---|---|---|
| 5,826,218 A * | 10/1998 | Khafizov et al. | 702/179 |
| 6,016,429 A * | 1/2000 | Khafizov et al. | 455/446 |
| 6,073,011 A * | 6/2000 | Horstein | 455/427 |
| 6,192,243 B1 * | 2/2001 | Yang et al. | 455/436 |
| 6,385,172 B1 * | 5/2002 | Kataria et al. | 370/238 |
| 6,535,742 B1 * | 3/2003 | Jiang et al. | 455/452.2 |
| 6,539,221 B1 * | 3/2003 | Vasudevan et al. | 455/423 |
| 6,628,637 B1 * | 9/2003 | Li et al. | 370/342 |
| 2003/0198203 A1 | 10/2003 | Antonio et al. | |

FOREIGN PATENT DOCUMENTS

| | | |
|---|---|---|
| EP | 0 993 008 A1 | 12/2000 |
| JP | 07-222232 | 8/1995 |
| JP | 08-191481 | 7/1996 |
| JP | 10-079976 | 3/1998 |
| JP | 2001313971 A | 11/2001 |
| WO | WO 98/24199 | 6/1998 |
| WO | WO 98/30057 | 7/1998 |
| WO | WO 98/53466 | 11/1998 |
| WO | WO 99/26439 | 5/1999 |

OTHER PUBLICATIONS

Austrialian Office Action Examiner's first report on patent application No. 2004201258.

Kleinrock, "Queueing Systems vol. 1: Theory," John Wiley & Sons, p. 105-106 1975.

A. Viterbi et al. "Erlang Capacity of a Power Controlled CDMA System" IEEE Journal on selected Area in Communications, vol. 11, No. 6, Aug. 1993.

Empirical Formula for Propagation Loss in Land Mobile Radio Services Masaharu Hata IEEE Transactions on Vehicular Technology, vol. VT-29, No. 3, Aug. 1980 p. 317-325.

Ishikawa et al., "Estimation Method of Interference Power Distribution and Call Blocking Rate in W-CDMA Reverse Link", IEEE General Convention 2000, B-5-31, p. 416, Mar. 2000.

Exact Compuration of Time and Call Blocking Probabilities in Multi-Traffic Circuit-Switched Networks Harry A.B. van de Vlag and Geert A. Awater 1994 IEEE p. 56-65.

Performance Analysis of Integrated Data/Voice Star Topology Circuit-Switched Networks Izhak Rubin, Jong K. Lee 1989 IEEE p. 0157-0162.

Fast Bandwidth Reservation Scheme With Multi-Link & Multi-Path Routing in ATM Networks Hiroshi Suzuki, Fouad A. Tobagi 1992 IEEE p. 2233-2240.

XP-002261043.

Design and Analysis of ATM Networks with Fluid Flow Sources Kazem Sohraby, Performance Analysis Department 1997 IEEE p. 1108-1113.

Fujii et al., "Cell Design System in Mobile Communication," NTT DoCoMo Technical Journal, vol. 2, No. 4, p. 28-34, Jan. 1995.

Ohmatuzawa et al., "Total Support System for Station Establishment Design," NTT DoCoMo Tecnical Journal, vol. 4, No. 1, p. 28-31, Apr. 1996.

Multi-Path Routing techniques for a Class of Multistage Fast Packet Switches G.J. Anido and A. W. Seeto Systems Development Overseas Telecommunications Commisions, Sydney, Australia p. 207-212.

Capacity Design and Performance of Call Admission Control in Cellular CDMA Systems Yoshihiro Ishikawa and Narumi Umeda, IEEE Journal on Selected Areas in Communications, vol. 15, No. 8, Oct. 1997.

* cited by examiner

COMMUNICATION PERFORMANCE CALCULATION METHOD AND COMMUNICATION PERFORMANCE CALCULATION APPARATUS IN MOBILE COMMUNICATION SYSTEM, AND BLOCKING PROBABILITY CALCULATION METHOD AND BLOCKING PROBABILITY CALCULATION APPARATUS IN COMMUNICATION SYSTEM, AND RECORDING MEDIUM

CROSS-REFERENCE TO RELATED APPLICATIONS

This application is a divisional application of commonly assigned, U.S. patent application Ser. No. 09/638,265, filed Aug. 15, 2000, now U.S. Pat. No. 7,024,186 and entitled "COMMUNICATION PERFORMANCE CALCULATION METHOD AND COMMUNICATION PERFORMANCE CALCULATION APPARATUS IN MOBILE COMMUNICATION SYSTEM, AND BLOCKING PROBABILITY CALCULATION METHOD AND BLOCKING PROBABILITY CALCULATION APPARATUS IN COMMUNICATION SYSTEM, AND RECORDING MEDIUM", which application is incorporated herein by reference in its entirety. That application claims priority to Japanese patent application serial number 11-234799 filed Aug. 20, 1999 and 2000-27990 filed Feb. 4, 2000, the contents of which are also incorporated herein by reference.

FIELD OF THE INVENTION

The present invention relates to a communication performance calculation method and a communication performance calculation apparatus in a mobile communication system, and a blocking probability calculation method and a blocking probability calculation apparatus in a communication system, and a recording medium. More particularly, the present invention relates to a method and apparatus for calculating performance such as the blocking probability (the probability of rejection of a new call to the system) in a base station, or the probability of degradation in the communication performance due to traffic concentration, and a recording medium associated therewith. The present invention also relates to a method and apparatus for calculating the blocking probability in a mobile communication system, and a recording medium associated therewith.

BACKGROUND OF THE INVENTION

In a mobile communication system like a widespread mobile telephone system today, the entire service area is usually divided into rather small areas called cells to provide services. Such a system comprises as shown in FIG. 1, for example, a plurality of base stations 102 for covering divided cells 106, and mobile stations 104 for conducting communication with the base stations 102 by establishing radio channels with the base stations.

The radio waves transmitted from the base stations 102 or mobile stations 104 at certain transmission power travel through the space with some attenuation and arrive at a receiving point. The attenuation the radio waves undergo usually increases with the distance between the transmitting site and the receiving site. Besides, the propagation loss varies greatly due to the surrounding geography and conditions of objects because the radio waves undergo blocking, reflection and diffraction by large buildings, mountains or hills. On the other hand, the receiving side requires received power higher than a certain level to receive and demodulate signals at a prescribed level of quality. Accordingly, it is very important for area design in mobile communication systems to cover the service area efficiently by utilizing limited transmission power.

To achieve such design, a method is often used which estimates radio wave propagation conditions in the service areas by simulating the radio wave propagation, from the specifications of the base stations and mobile stations and geographic data using a computer. Such a method is described, for example, in "Cell Design System in Mobile Communication" by Fujii, Asakura and Yamazaki, NTT DoCoMo Technical Journal Vol. 1, No. 4, pp. 28-34, 1995-01, or in "Total Support System for Station Establishment Design" by Ohmatuzawa and Yamashita, NTT DoCoMo Technical Journal Vol. 4, No. 1, pp. 28-31, 1996-04. These methods divide the cells into smaller subdivisions, store altitude data, geographic data and communication traffic data of individual subdivisions, and calculate the signal-to-interference ratio (SIR) at each receiving site or traffic for each base station. These methods employ as a multiple access scheme, frequency division multiple access (FDMA), or time division multiple access (TDMA).

On the other hand, as for code division multiple access (CDMA), not only the propagation conditions that vary the performance of the FDMA and TDMA, but also the communication traffic and its temporal variations have great effect on the performance. Japanese Patent Application laid-open No. 8-191481 (1996), "Call Admission Control Method and Apparatus", discloses a method of deciding the admission of a new call on the basis of an estimate of interference at a base station, in which it is emphasized that the interference is an important factor of deciding the performance of uplink channels in a CDMA system.

Furthermore, International Publication No. WO98/30057 "Call Admission Control Method and Mobile Station in CDMA Mobile Communication System" discloses a method for a mobile station to make a call admission decision by transmitting information on the uplink interference and downlink transmission power from the base station to mobile stations, in which it is emphasized that the total transmission power of the base station is an important factor of deciding the performance for the downlink. Such a scheme that carries out the area design with considering the communication traffic and its time variations is new to the CDMA system.

The foregoing conventional schemes have a great problem of being inapplicable to a CDMA system without change because interference caused by communications conducted by neighboring base stations is not counted as the traffic.

In addition, although the interference power from the same radio channel reused in distant sites greatly degrades the performance in the FDMA or TDMA system, since it is not counted as the traffic, it presents a problem of hindering accurate performance calculation.

Furthermore, since the conventional scheme does not consider the total downlink transmission power that serves as an important index in the CDMA system, it has a great problem of being inapplicable to the CDMA system without change.

Moreover, although the total transmission power has a great effect on the performance in the FDMA or TDMA system with a configuration of amplifying signals in common which are transmitted using multiple channels, there is no calculation method applicable to such a configuration, which presents a problem of being unable to calculate its performance.

In a communication system in which many users share a limited number of communication channels, there arises an occasion on which no communication channel is assignable to a user.

In a general communication system such as a fixed telephone system or mobile telephone system, many users share communication resources. For example, consider an office telephone system shared by ten employees. The probability that the ten employees conduct telephone conversations at the same time is very small, nearly zero. Thus, the number of circuits required in the office can be less than ten, and the employees share the limited number of channels, use them when necessary, and release them after their conversations so that other employees can use them. However, it sometimes takes place that no channel is available because all the channels are busy. In such a case, many of the present communication systems reject a new call, resulting in a call loss. It is preferable that the number of channels be as small as possible from an economical point of view. An excessively small number of channels, however, will increase the call loss and complaints of the employees, or hinder smooth processing of jobs. To satisfy such conflicting requirements, the Erlang B formula (see, Leonard Kleinrock, "Queueing Systems Volume I: Theory", John Wiley & Sons, pp. 105-106, 1975, for example) is used to implement a sufficiently small blocking probability of about 1% to 3%, for example, in designing the number of channels.

Such consideration about the office telephone system is also applicable to the fixed telephone system and the mobile communication system, as well. In particular, in the mobile communication system, communications between the base stations and mobile stations are established using radio transmission, and the resources the communications use are radio channels. Since the frequency band available for the mobile communication system is generally limited, the resource sharing becomes a more serious issue than in the fixed telephone network that uses wired circuits for information transmission. As radio channel access schemes the mobile communication usually utilizes, there are frequency division multiple access (FDMA), time division multiple access (TDMA) or code division multiple access (CDMA).

In the FDMA or TDMA system, the number of radio channels to be assigned to the stations can be designed using the Erlang B formula as in the conventional system because the radio frequencies available are assigned to the base stations in advance. In the CDMA system, however, since the base stations share the same radio frequency band, the conventional method is inapplicable.

The International Publication No. WO98/30057 "Call Admission Control Method and Mobile Station in CDMA Mobile Communication System" discloses a method of making a call admission decision on the basis of the uplink interference power observed by the base station and transmission power of the base station. It, however, only describes the method of making a decision as to whether the call is acceptable or not, and cannot obtain the blocking probability from the traffic applied to the system.

On the other hand, there is an example that formulates the relationship between the applied traffic and the blocking probability in the CDMA system. For example, a paper by A. M. Viterbi and A. J. Viterbi, "Erlang capacity of a power controlled CDMA system", IEEE J. Select. Areas Commun., Vol. 11, pp. 892-900, August 1993, discloses a method of calculating the mean and variance of the interference power observed by the base station from applied traffic, and simply calculating the blocking probability on the assumption that the interference power is normally distributed. The paper calculates the blocking probability $P_{blocking}$ by the following formula.

$$P_{blocking} \approx Q\left[\frac{A - E(Z')}{\sqrt{Var(Z')}}\right] \quad (1)$$

where $E\{Z'\}$ is the mean of the normalized interference, $Var\{Z'\}$ is the variance of the normalized interference, both of which are expressed as a function of the applied traffic. On the other hand, A is a threshold value of the normalized interference, and $Q(x)$ is defined by the following equation.

$$Q(x) = \int_x^\infty \frac{1}{\sqrt{2\pi}} e^{-t^2/2} dt \quad (2)$$

Expression (1) corresponds to calculating the probability that the normalized interference, which is assumed to have the normal distribution, exceeds the threshold value A.

In practice, however, the interference power reduces when the call loss is present, and accurate calculation of the blocking probability is impossible without considering the reduction in the interference power due to the call loss.

FIG. 14 is a block diagram illustrating the calculation of the blocking probability by the conventional technique (disclosed by the foregoing paper). The method described in the paper calculates the blocking probability without considering the reduction in the interference power due to the call loss. Thus, it has a serious problem of being unable to calculate the blocking probability accurately.

BRIEF SUMMARY OF THE DISCLOSURE

The present invention is implemented in view of the foregoing problems. Therefore, an object of the present invention is to provide a method and the like of accurately and simply calculating the performance in a base station by calculating the traffic distribution in the base station in a mobile communication system.

Another object of the present invention is to provide a method and the like of simply and accurately calculating the blocking probability in a mobile communication system. The present invention modifies the load (such as applied traffic (applied traffic intensity), interference power, transmission power of the base station) in the mobile communication system by using a dummy generated within the system. This makes it possible to model the reduction in the load due to call loss which is not considered conventionally, and to better simulate an actual model by the simplified calculation of the blocking probability, thereby improving the accuracy of the blocking probability. In addition, the present invention determines the amount of change of the dummy on the basis of the blocking probability calculated and the dummy generated within the system, and calculates the blocking probability with varying the dummy. This makes it possible to bring the blocking probability and load reduction into balance, thereby improving the accuracy of the blocking probability.

To accomplish the objects of the present invention, in a first aspect of the present invention, there is provided a blocking probability calculation method in a mobile communication system, the blocking probability calculation method comprising:

a load input step of inputting a load b on the mobile communication system;

a dummy generating step of generating a dummy pd;

a modified load calculating step of calculating a modified load b' from the load b using the dummy pd; and a blocking probability calculating step of calculating a blocking probability p from the modified load b', wherein the dummy generating step compares the dummy pd with the blocking probability p, and generates a new dummy pd from a compared result.

The dummy generating step may compare the dummy pd with the blocking probability p, may make the new dummy pd greater than the current dummy pd when p>pd, and may make the new dummy pd smaller than the current dummy pd when p<pd.

The blocking probability calculating step may calculate from the modified load b' a plurality of blocking probabilities p1, p2, . . . , pN, where N is a natural number, the blocking probability calculation method may further comprise an estimated value calculating step of calculating an estimated value C from the plurality of blocking probabilities p1, p2, . . . , pN, and the dummy generating step may compare the dummy pd with the estimated value C, and may generate a new dummy pd from a compared result.

The estimated value C may equal $1-(1-p1) \times (1-p2) \times \ldots \times (1-pN)$ and the dummy generating step may compare the dummy pd with the estimated value C, may make the new dummy pd greater than the current dummy pd when C>pd, and may make the new dummy pd smaller than the current dummy pd when C<pd.

The modified load b' may equal $(1-pd) \times b$.

In a second aspect of the present invention, there is provided a computer readable recording medium storing a program causing a computer to execute a blocking probability calculation method in a mobile communication system, the blocking probability calculation method comprising:

a load input step of inputting a load b on the mobile communication system;

a dummy generating step of generating a dummy pd;

a modified load calculating step of calculating a modified load b' from the load b using the dummy pd; and a blocking probability calculating step of calculating a blocking probability p from the modified load b', wherein the dummy generating step compares the dummy pd with the blocking probability p, and generates a new dummy pd from a compared result.

In a third aspect of the present invention, there is provided a blocking probability calculation apparatus in a mobile communication system, the blocking probability calculation apparatus comprising:

load input means for inputting a load b on the mobile communication system;

dummy generating means for generating a dummy pd;

modified load calculating means for calculating a modified load b' from the load b using the dummy pd; and blocking probability calculating means for calculating a blocking probability p from the modified load b', wherein the dummy generating means compares the dummy pd with the blocking probability p, and generates a new dummy pd from a compared result.

Here, the dummy generating means may compare the dummy pd with the blocking probability p, may make the new dummy pd greater than the current dummy pd when p>pd, and may make the new dummy pd smaller than the current dummy pd when p<pd.

The blocking probability calculating means may calculate from the modified load b' a plurality of blocking probabilities p1, p2, . . . , pN, where N is a natural number, the blocking probability calculation apparatus may further comprise an estimated value calculating means for calculating an estimated value C from the plurality of blocking probabilities p1, p2, . . . , pN, and the dummy generating means may compare the dummy pd with the estimated value C, and may generate a new dummy pd from a compared result.

The estimated value C may equal $1-(1-p1) \times (1-p2) \times \ldots \times (1-pN)$, and the dummy generating means may compare the dummy pd with the estimated value C, may make the new dummy pd greater than the current dummy pd when C>pd, and may make the new dummy pd smaller than the current dummy pd when C<pd.

The modified load b' may equal $(1-pd) \times b$.

The foregoing configuration makes it possible to carry out accurate and simple calculation of the performance at the base stations in the mobile communication system.

In addition, it makes it possible to carry out simple and accurate calculation of the blocking probability in the communication system.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
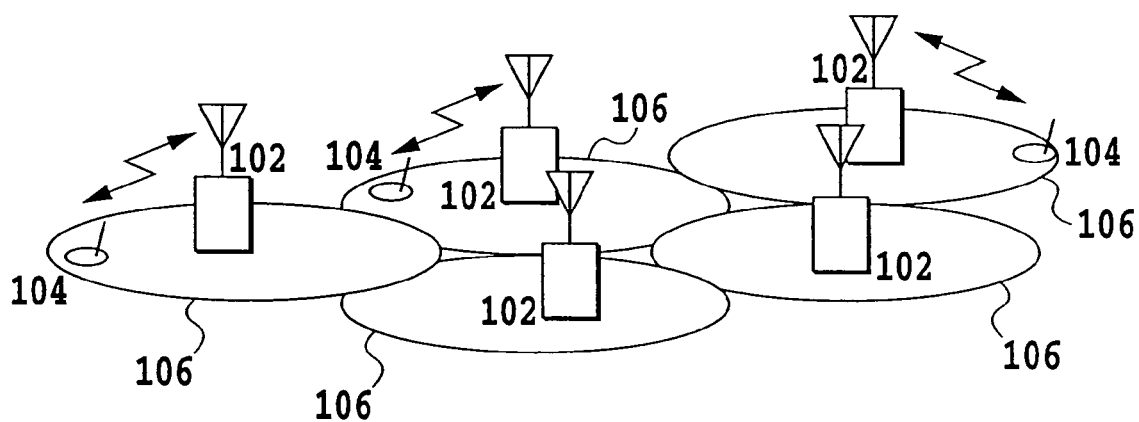
FIG. 1 is a diagram schematically showing a conventional mobile communication system.
Figure 2:
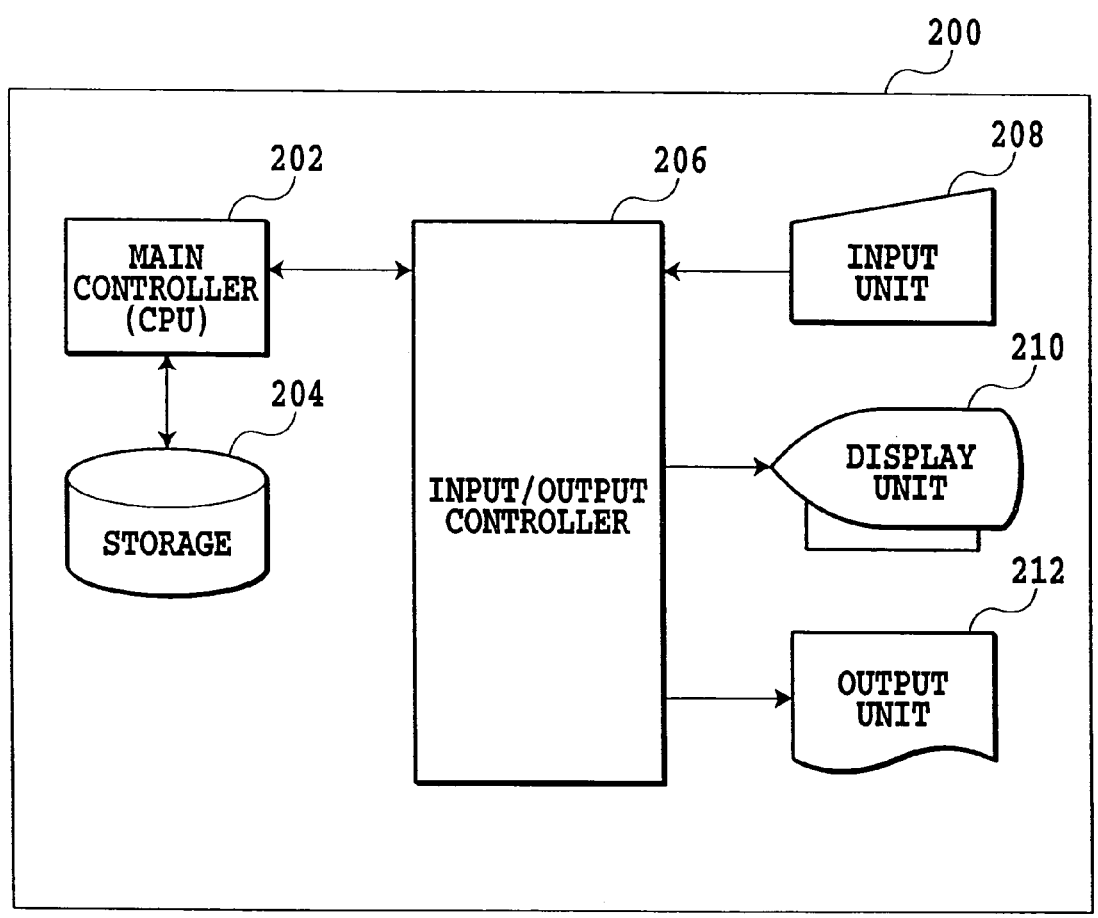
FIG. 2 is a block diagram showing a configuration of a performance calculation apparatus of the mobile communication system of a first embodiment in accordance with the present invention.

FIG. 2 is a block diagram showing a hardware configuration of a performance calculation apparatus of a first embodiment in accordance with the present invention. A performance calculation apparatus 200 of the present embodiment comprises a main controller 202, a storage 204, an input/output controller 206, an input unit 208, a display unit 210 and an output unit 212, and can consist of a personal computer, for example.

Figure 3:
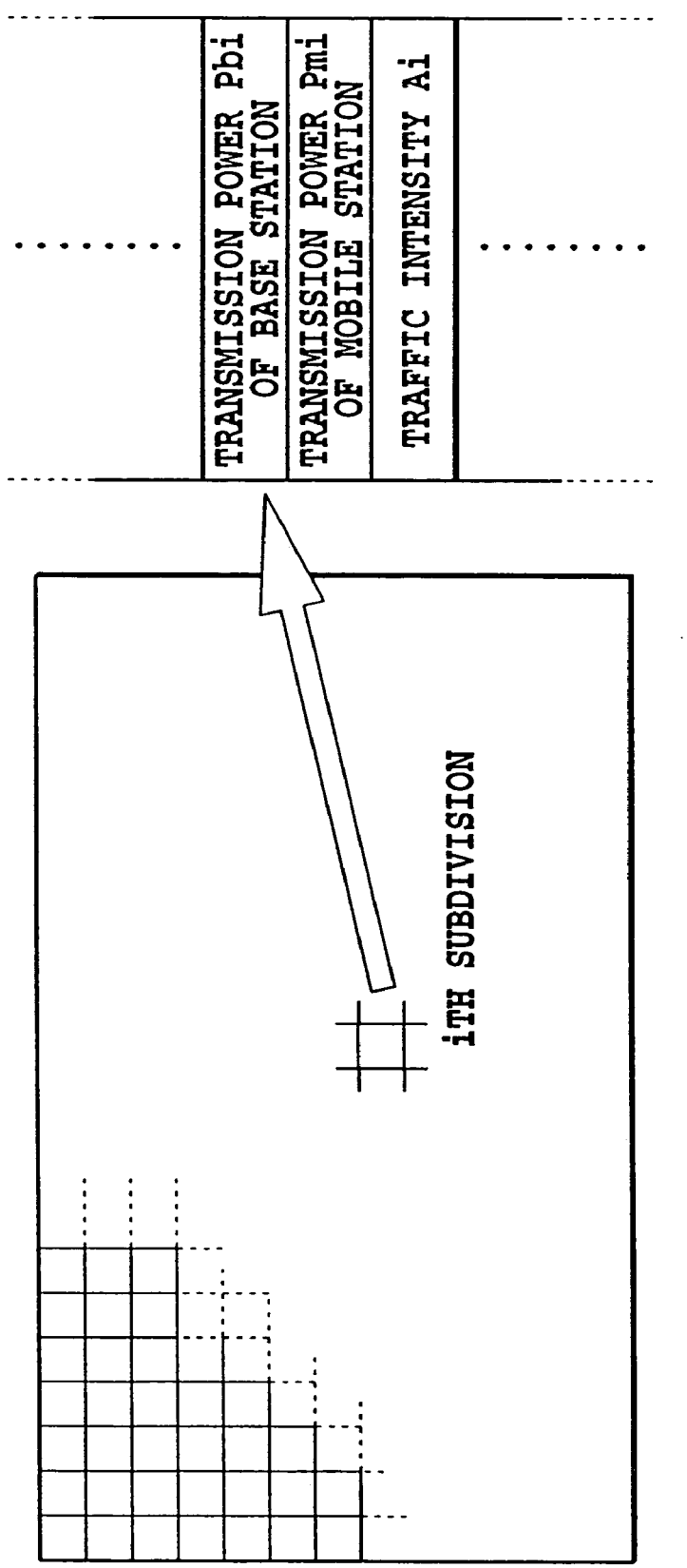
FIG. 3 is a schematic diagram illustrating a relationship between an area divided into a plurality of subdivisions and records on a storage corresponding to each subdivision in the first embodiment.

The left-hand side of FIG. 3 illustrates that each cell is divided into a plurality of subdivisions in the present invention. The right-hand side of FIG. 3 illustrates that the storage such as a fixed disk or memory stores for each subdivision at least one of the transmission powers (Pbi and Pmi) of a base station and mobile station when the mobile station visited the subdivision, and traffic intensity Ai of the present subdivision. To calculate the received power at a receiving site from the stored transmission power, it is calculated using such factors stored in the storage as the heights above the ground of antennas of the base stations and mobile stations, used radio frequencies, and the directivities of antennas of the base stations and mobile stations. The received power can be calculated using an empirical formula of the received power calculation disclosed, for example, in M. Hata, "Empirical Formula for Propagation Loss in Land Mobile Radio Services", IEEE Trans. on Vehic. Technol., Vol. VT-29, No. 3, August 1980.

Figure 4:
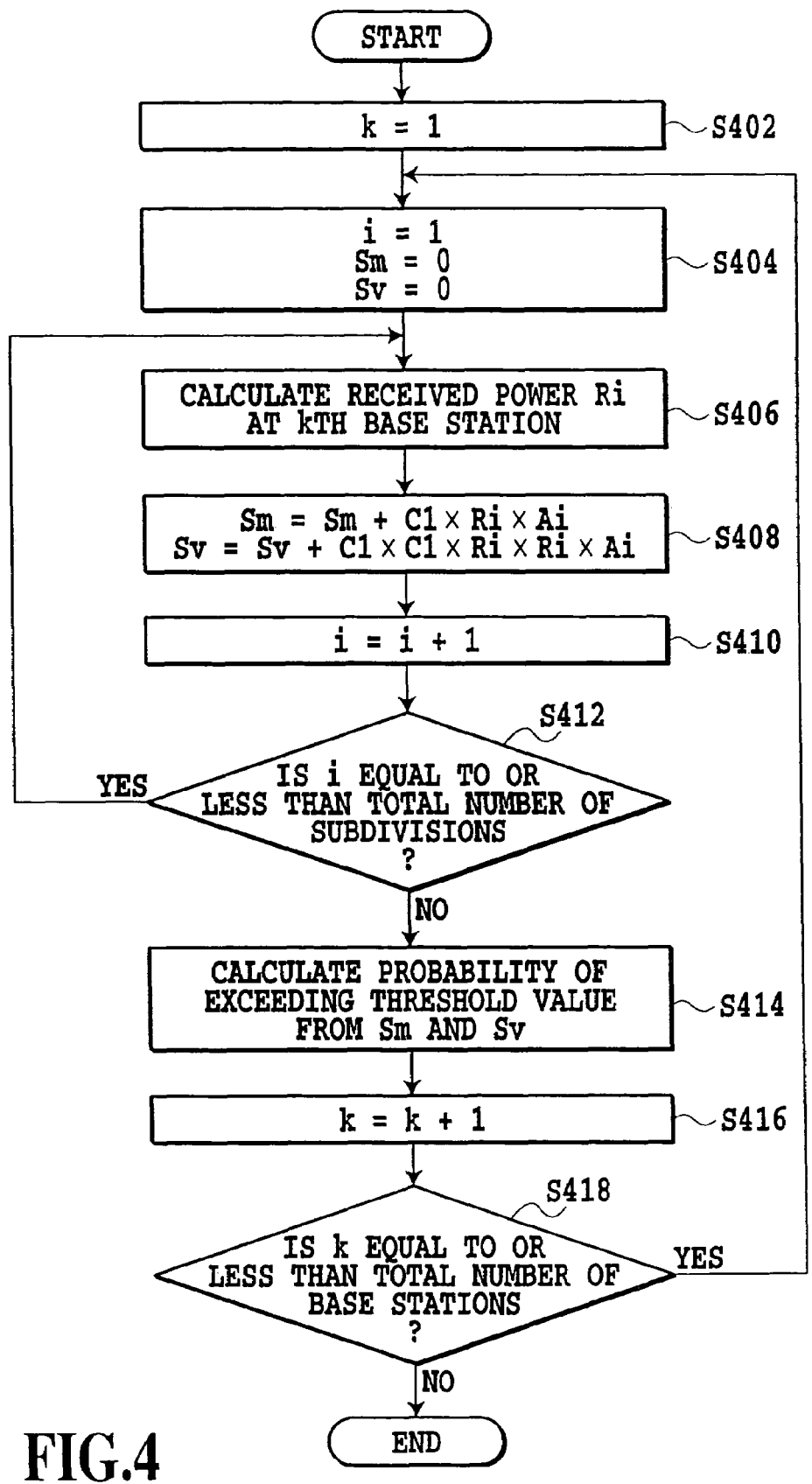
FIG. 4 is a flowchart illustrating an operation when the present invention is applied to an uplink channel.

FIG. 4 is a flowchart illustrating an operation when the present invention is applied to an uplink channel. On the basis of the transmission power of the mobile station stored for each subdivision, the received power Ri at each base station, which corresponds to the signal transmitted from the mobile station present in the ith subdivision and received by the base station, is calculated. A step of calculating the mean and variance of the applied traffic calculates the mean of the applied traffic at the base station by the following equation.

$$\text{Average} = C0 + \Sigma(C1 \times Ri \times Ai) \quad (3)$$

where Ai is the traffic intensity of the ith subdivision, C0 is a given constant, and C1 is a non-negative constant.

On the other hand, the variance of the applied traffic at the base station is calculated by the following equation.

$$\text{Variance} = C2 + \Sigma(C1 \times C1 \times Ri \times Ri \times Ai) \quad (4)$$

where C2 is a positive constant.

Since the present embodiment is configured such that it calculates the variance besides the mean from the static data stored for each subdivision, it can calculate the degradation in communication performance and the blocking probability due to temporal variations in the traffic.

More specifically, a variable k for counting the base stations is initialized to one (step S402). Subsequently, a variable i for counting the subdivisions is initialized to one, and variables Sm and Sv for representing the mean and variance are initialized to zero (step S404). The received power of the base station is calculated for each subdivision (step S406). The calculation method is determined in advance as described above, in which the factors are used such as the heights above the ground of the antennas of the base station and mobile stations, the used radio frequencies and the directivities of antennas of the base station and mobile stations, and the foregoing empirical formula of the received power is used. Subsequently, the mean Sm and variance Sv are updated using the received power (step S408). The variable i is incremented by one (step S410), and the same operation is iterated if i is equal to or less than the number of the intended subdivisions (step S412). If i exceeds the number of the subdivisions, the performance calculation is started using the calculated Sm and Sv, and a predetermined threshold value (step S414). The calculation can be carried out in various methods depending on performance specifications. For example, when approximating the traffic distribution by a normal distribution, the performance P can be calculated by the following equation using a complementary error function Erfc (').

$$P = \frac{1}{2} Erfc \left[ \frac{T - Sm}{\sqrt{2Sv}} \right] \quad (5)$$

where T is the threshold value which can take one of the following values, for example: First, the interference power acceptable to the base station or its constant multiple; second, the sum of interference power acceptable to the base station or its constant multiple and the thermal noise power of the receiver of the base station; and third, a value C $(1-1/\eta\})$, where $\eta$ is the ratio of the sum I to the thermal noise power N of the base station receiver, C is a given positive constant, and I is the sum of interference power acceptable to the base station or its constant multiple and the thermal noise power of the base station receiver. Subsequently, the variable k is incremented by one to proceed to the calculation of the next base station (step S416).

If k is equal to or less than the number of the intended base stations, the same processing is iterated for the next base station (step S418). If k exceeds the number of the intended base stations, the processing is completed. Although the constants C0 and C2 are assumed to be zero in the present flowchart, they can be any constant.

Figure 5:
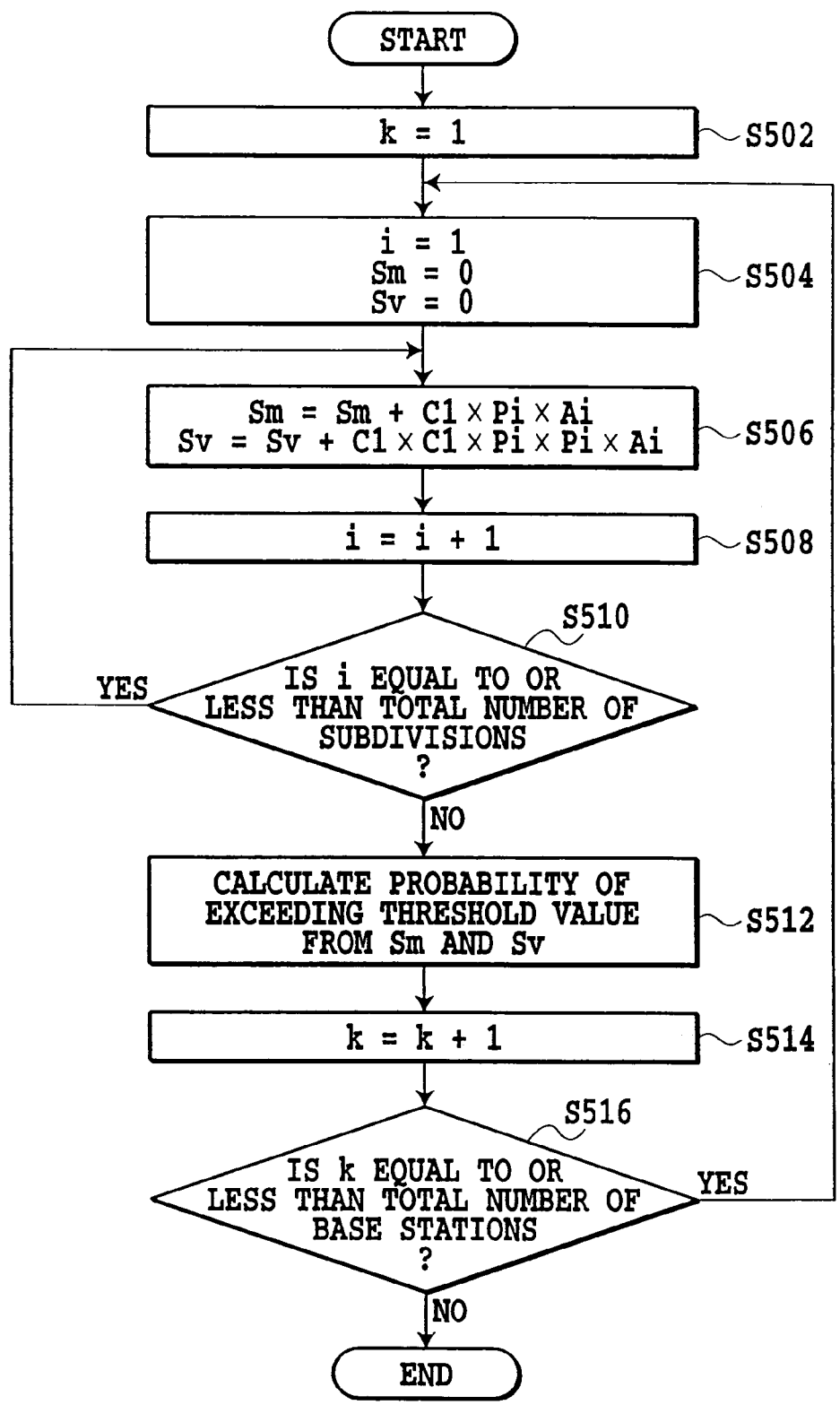
FIG. 5 is a flowchart illustrating an operation when the present invention is applied to a downlink channel.

FIG. 5 is a flowchart illustrating an operation when the present invention is applied to a downlink channel. In this case, the mean of the applied traffic at the base station is calculated by the following equation.

$$\text{Mean} = C0 + \Sigma(C1 \times Pi \times Ai) \quad (6)$$

where Pi is transmission power of the base station. The variance of the applied traffic at the base station is calculated by the following equation.

$$\text{Variance} = C2 + (C1 \times C1 \times Pi \times Pi \times Ai) \quad (7)$$

Since the present embodiment is configured such that it calculates the variance besides the mean from the static data stored for each subdivision, it can calculate the degradation in communication performance and the blocking probability due to temporal variations in the traffic.

More specifically, a variable k for counting the base stations is initialized to one (step S502). Subsequently, a variable i for counting the subdivisions is initialized to one, and variables Sm and Sv for representing the mean and variance are initialized to zero (step S504). Subsequently, the mean Sm and variance Sv are updated using the transmission power stored for each subdivision (step S506). The variable i is incremented by one (step S508), and the same operation is iterated if i is equal to or less than the number of the intended subdivisions (step S510). If i exceeds the number of the subdivisions, the performance calculation is started using the calculated Sm and Sv, and the predetermined threshold value (step S512). The calculation can be carried out in various methods depending on performance specifications. For example, when approximating the traffic distribution by a normal distribution, the performance P can be calculated by the following equation using the complementary error function Erfc(').

$$P = \frac{1}{2} Erfc\left[\frac{T - Sm}{\sqrt{2Sv}}\right] \quad (8)$$

where T is the threshold value which can take the total maximum transmission power of the base stations or its constant multiple, for example. Subsequently, the variable k is incremented by one to proceed to the calculation of the next base station (step 8514). If is equal to or less than the number of the intended base stations, the same processing is iterated for the next base station (step 8516). If k exceeds the number of the base stations, the processing is completed. Although the constants C0 and C2 are assumed to be zero in the present flowchart, they can be any constant.

Figure 6:
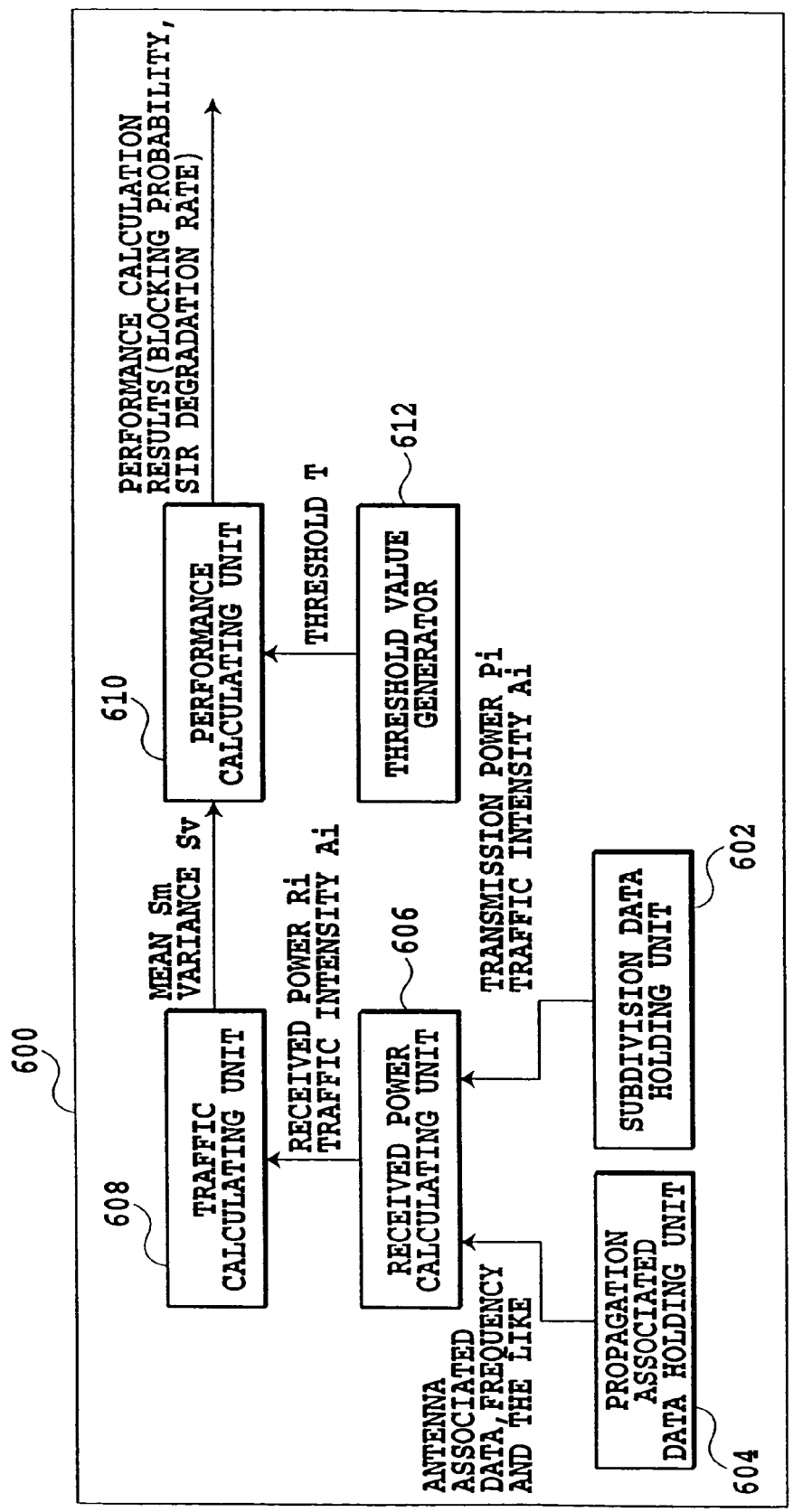
FIG. 6 is a block diagram showing a configuration of an uplink channel performance calculation apparatus to which the present invention is applied.

FIG. 6 is a block diagram showing a hardware configuration of a performance calculation apparatus 600 of an uplink channel, to which the present invention is applied. In this figure, a subdivision data holding unit 602 holds the data of the transmission power Pi and traffic intensity Ai of each subdivision. A propagation associated data holding unit 604 holds the heights above the ground of the antennas of the base stations and mobile stations, radio frequencies or directivities of the antennas of the base stations and mobile stations, which are used for calculating the received power. A received power calculating unit 606 reads necessary data from the subdivision data holding unit 602 and propagation associated data holding unit 604, and calculates the received power. A traffic calculating unit 608 calculates the mean 8m and variance 8v of the traffic at the base stations from the received power Ri for each subdivision calculated by the received power calculating unit 606 and from the traffic intensity Ai. A performance calculating unit 610 calculates the performance such as the blocking probability and the probability of the degradation in the communication performance using the mean Sm and variance Sv calculated by the traffic calculating unit 608 and the threshold value T provided by a threshold value generator 612, and outputs them. The calculation of the performance using the mean Sm and variance Sv calculated by the traffic calculating unit 608, and the predetermined threshold value T can be carried out in various methods. For example, when approximating the traffic distribution by the normal distribution, the performance P can be calculated by the following equation using the complementary error function Erfc (').

$$P = \frac{1}{2} Erfc\left[\frac{T - Sm}{\sqrt{2Sv}}\right] \quad (9)$$

where T is the threshold value which can take one of the following values, for example: First, the interference power acceptable to the base station or its constant multiple; second, the sum of interference power acceptable to the base station or its constant multiple and the thermal noise power of the receiver of the base station; and third, a value C $(1-1/\eta)$, where $\eta$ is the ratio of the sum I to the thermal noise power N of the base station receiver, C is a given positive constant, and I is the sum of interference power acceptable to the base station or its constant multiple and the thermal noise power of the base station receiver.

Figure 7:
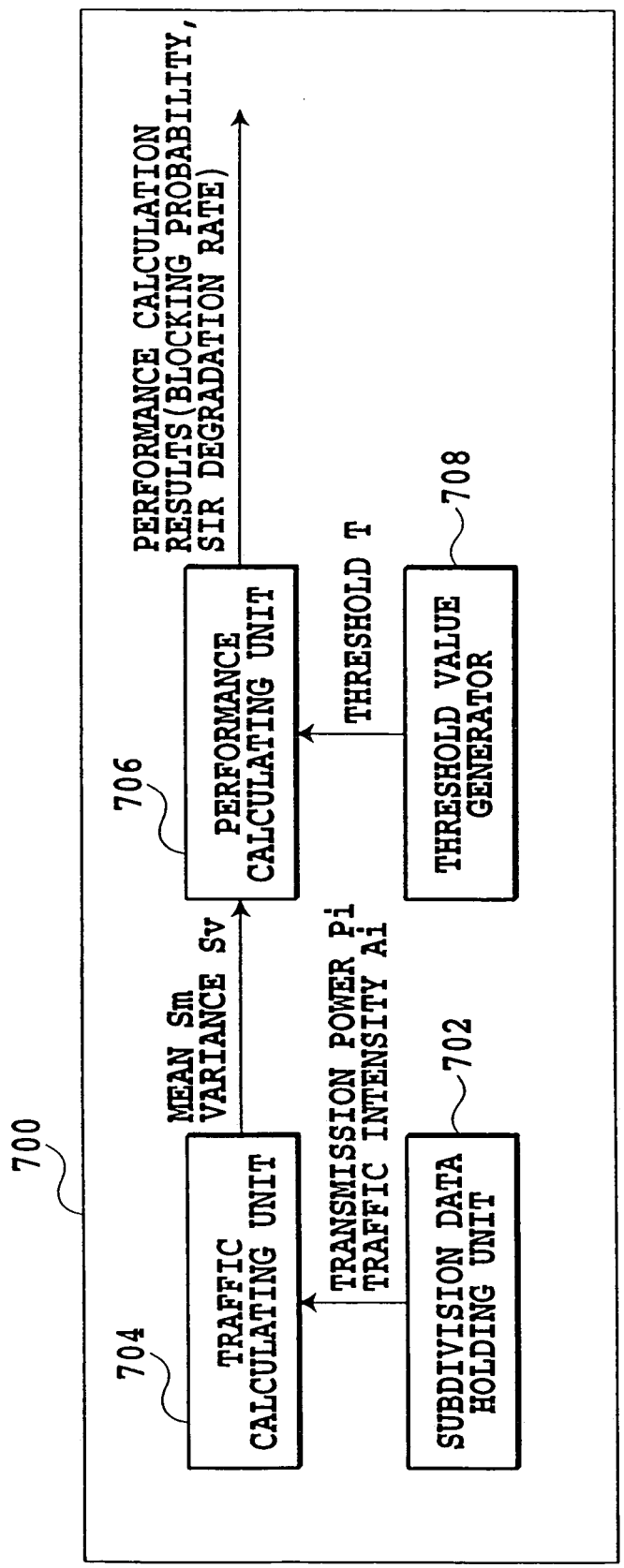
FIG. 7 is a block diagram showing a configuration of a downlink channel performance calculation apparatus to which the present invention is applied.

FIG. 7 is a block diagram showing a hardware configuration of a performance calculation apparatus 700 of a downlink channel, to which the present invention is applied. In this figure, a subdivision data holding unit 702 holds the transmission power Pi and traffic intensity Ai of each subdivision. A traffic calculating unit 704 calculates the mean Sm and variance Sv of the traffic at the base stations from the transmission power Pi and traffic intensity Ai. A performance calculating unit 706 calculates the performance such as the blocking probability and the probability of the degradation in the communication performance using the mean Sm and variance Sv calculated by the traffic calculating unit 704 and the threshold value T provided by a threshold value generator 708, and outputs them. The calculation of the performance using the calculated mean Sm and variance Sv, and the predetermined threshold value T can be carried out in various methods. For example, when approximating the traffic distribution by the normal distribution, the performance P can be calculated by the following equation using the complementary error function Erfc(').

$$P = \frac{1}{2} Erfc\left[\frac{T - Sm}{\sqrt{2Sv}}\right] \quad (10)$$

where T is the threshold value which can take the total maximum transmission power of the base stations or its constant multiple, for example.

As described above, the method according to the present invention comprises a transmission power data storing step of storing transmission power data of the base stations corresponding to the subdivisions where the mobile stations are distributed and/or of the mobile stations visiting the subdivisions; a traffic intensity data storing step of storing traffic intensity data of the subdivisions; a traffic calculating step of calculating a mean and variance of applied traffic to the base stations; and a communication performance calculating step of calculating communication performance from the mean and variance. This makes it possible to carry out accurate and simple calculation of the communication performance.

In addition, according to the present invention, the traffic calculating step comprises a first calculating step of calculating, from the transmission power data of the mobile stations stored in the transmission power data storing step, received power at the base stations of signals sent from the mobile stations to the base stations; and a second calculating step of calculating, from the traffic intensity data stored in the traffic intensity data storing step and the received power, the mean and variance of the applied traffic at the base stations, thereby not only counting the interference traffic caused by communications carried out by the base stations of other subdivisions, but also counting as the traffic the interference power from the same radio channel reused by other subdivisions. This makes it possible to carry out accurate and simple calculation of the communication performance.

Furthermore, according to the present invention, the traffic calculating step comprises a third calculating step of calculating the mean and variance of the applied traffic at the base stations from the transmission power data of the base stations stored in the transmission power data storing step, and from the traffic intensity data stored in the traffic intensity data storing step, thereby taking account of the total downlink transmission power. Using the calculation method corresponding to this makes it possible to carry out the highly accurate and simple calculation of the communication performance at the base stations.

In addition, according to the present invention the communication performance calculating step comprises a probability calculating step of calculating probability distribution from the mean and variance of the applied traffic; and a probability decision step of calculating a probability that the applied traffic exceeds a predetermined threshold value. This makes it possible to carry out accurate and simple calculation of the communication performance.

Moreover, according to the present invention, the probability decision step is comprises a step of setting acceptable interference power to the base stations or its constant multiple as the threshold value. This makes it possible to carry out highly accurate calculation of the communication performance.

In addition, according to the present invention, the probability decision step comprises a step of setting a sum of acceptable interference power to the base stations or its constant multiple and thermal noise power of receivers in base stations as the threshold value. This makes it possible to carry out highly accurate calculation of the communication performance.

Furthermore, according to the present invention, the probability decision step comprises a threshold value calculating step of carrying out calculation using a ratio of a sum of acceptable interference power to the base stations or its constant multiple and thermal noise power of receivers in the base stations to thermal noise power of the receivers; and a step of setting a calculation result in the threshold value calculating step as the threshold value. This makes it possible to carry out highly accurate calculation of the communication performance.

Moreover, according to the present invention, the probability decision step comprises a step of setting a total sum of maximum transmission powers of the base stations or its constant multiple as the threshold value. This makes it possible to carry out highly accurate calculation of the communication performance.

Second Embodiment

Figure 8:
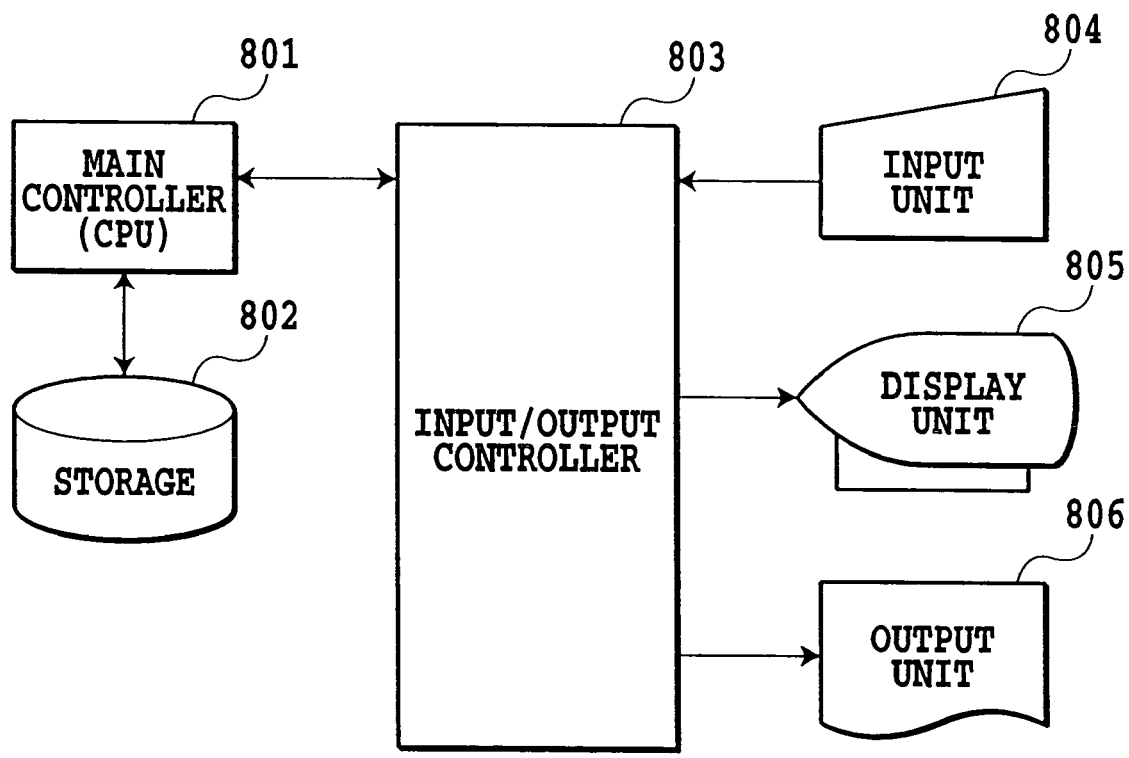
FIG. 8 is a block diagram showing a hardware configuration of a blocking probability calculation apparatus of a second embodiment in accordance with the present invention.

FIG. 8 is a block diagram showing a hardware configuration of a blocking probability calculation apparatus of a second embodiment in accordance with the present invention. The blocking probability calculation apparatus of the present embodiment comprises a main controller 801, a storage 802, an input/output controller 803, an input unit 804, a display unit 805 and an output unit 806, which can consist of a personal computer, for example.

The main controller 801 consists of a CPU, for example, and carries out comprehensive control of the entire system. The main controller 801 is connected with the storage 802. The storage 802 can consist of a hard disk, a flexible disk, an optical disk or the like. The main controller 801 is connected, through the input/output controller 803, with the input unit 804 such as a keyboard and a mouse, with the display unit 805 for displaying input data, calculation results and the like, and with the output unit 806 such as a printer for outputting the calculation results.

The main controller 801 comprises an internal memory for storing its control program such as OS (Operating System), application programs such as calculating the blocking probability and data required, and carries out the calculation of the blocking probability using these programs.

Figure 9:
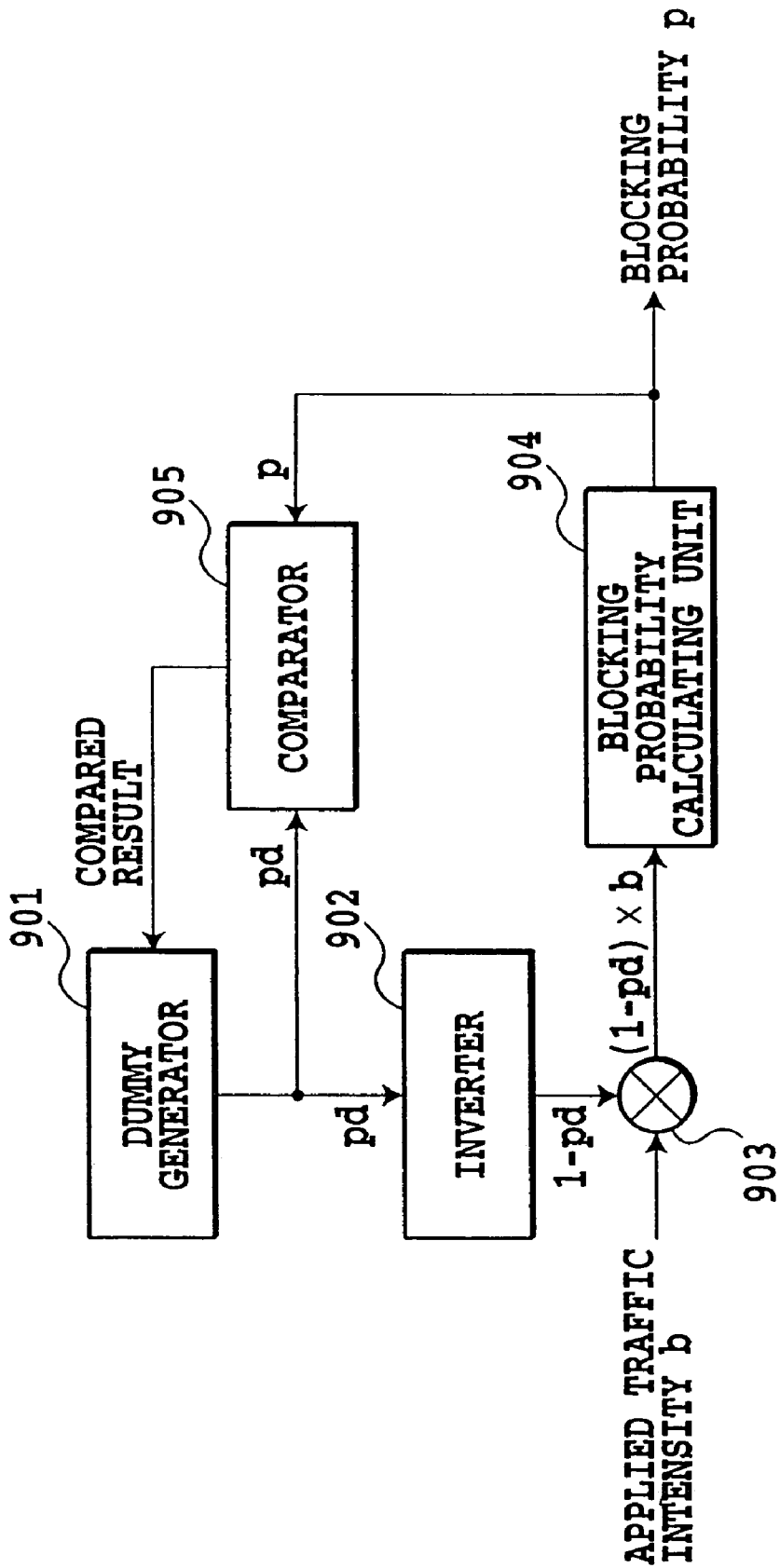
FIG. 9 is a block diagram illustrating functions of the blocking probability calculation apparatus of the second embodiment.
Figure 10:
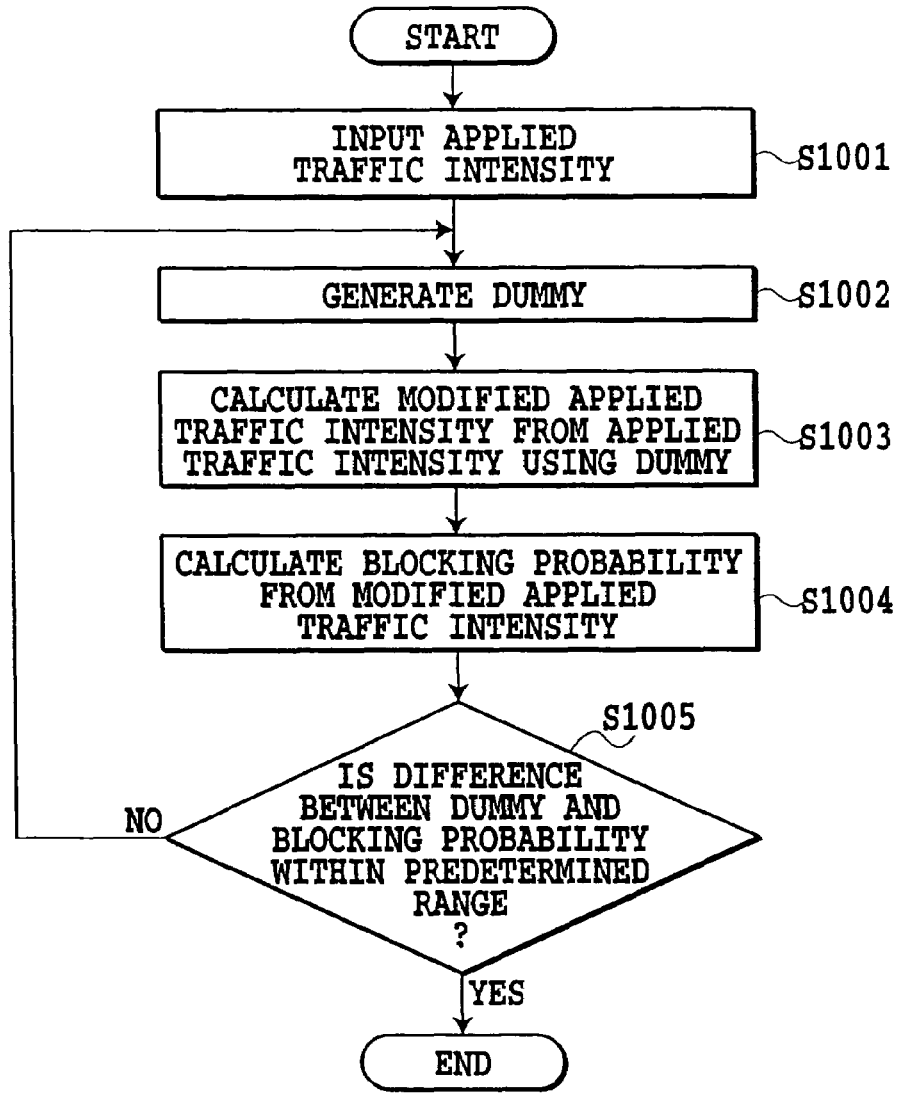
FIG. 10 is a flowchart illustrating a blocking probability calculation processing by the blocking probability calculation apparatus of the second embodiment.

FIG. 9 is a block diagram illustrating functions of the blocking probability calculation apparatus of the present embodiment; and FIG. 10 is a flowchart illustrating a blocking probability calculation processing by the blocking probability calculation apparatus of the present embodiment.

The blocking probability calculation apparatus as shown in FIG. 9 comprises a dummy generator 901, an inverter 902, a multiplier 903, a blocking probability calculating unit 904 and a comparator 905.

First, the blocking probability calculation apparatus receives the input with a load b on the communication system through the input unit 804 (step S1001). In the present embodiment, it receives the applied traffic intensity as the load on the communication system.

Subsequently, the dummy generator 901 generates the dummy pd (step S1002). A modified applied traffic intensity b' is calculated from the applied traffic intensity b using the generated dummy pd (step S1003). Specifically, the inverter 902 converts the generated dummy pd to (1−pd), and the multiplier 903 multiplies it by the applied traffic intensity b, thereby obtaining the modified applied traffic intensity b'= (1−pd)×b.

Subsequently, the blocking probability calculating unit 904 calculates the blocking probability p from the modified applied traffic intensity b' (step S1004). In the present embodiment, the blocking probability p is calculated using the method (formulae (1) and (2)) disclosed in the paper described above.

Then, the comparator 905 compares the dummy pd with the blocking probability p, and terminates the processing when the difference between the two is within a predetermined range, that is, when the two are considered to be equal (step S1005), in which case, it is considered that the sufficiently accurate blocking probability p is obtained. In other words, when the dummy pd is considered equal to the calculated blocking probability p, the modified applied traffic intensity b'=(1−pd)×b is considered equal to (1−p)×b, which represents the applied traffic intensity taking account of the call loss. Accordingly, the blocking probability calculated from the modified applied traffic intensity b' can be considered accurate. The blocking probability p thus calculated is displayed on the display unit 805 as needed, and is output to the output unit 806.

When the difference between the dummy pd and the calculated blocking probability p exceeds the predetermined range, the processing is returned to step S1002 (step S1005). At step S1002, a new dummy pd is generated from the compared result of the dummy pd with the calculated blocking probability p. More specifically, a new dummy pd is made larger than the current pd if P>pd, and is made smaller than the current pd if P<pd.

After that, the processing from step S1002 to step S1004 is iterated until the difference between the dummy pd and the blocking probability p falls within the predetermined range.

Thus, the simple and accurate calculation of the blocking probability can be implemented in the mobile communication system.

Although the blocking probability calculation processing of the present embodiment, that is, the processing by the dummy generator 901, inverter 902, multiplier 903, blocking probability calculating unit 904 and comparator 905 is carried out by means of software (programs), it can be implemented by means of hardware. In addition, the program of the blocking probability calculation processing can be prestored in a floppy disk, CD-ROM or the like so that the program can be loaded onto a memory or hard disk before its execution.

Furthermore, although the applied traffic intensity is input as the load on the mobile communication system in the present embodiment, the interference power, the transmission power of the base station or the like can be input instead. In addition, although the calculation method disclosed in the paper described above is used for calculating the blocking probability, other calculation methods can be utilized.

Moreover, the present invention is applicable to any system such as a fixed telephone communication system and a mobile communication system using an FDMA, TDMA or CDMA, as long as it allows a plurality of users to carry out communications with sharing the-resources, offering similar advantages.

Third Embodiment

The third embodiment of the blocking probability calculation apparatus in accordance with the present invention calculates the blocking probability of each factor when a plurality of factors are present which bring about a call loss, each. The hardware configuration of the present embodiment of the blocking probability calculation apparatus is the same as that of FIG. 8.

Figure 11:
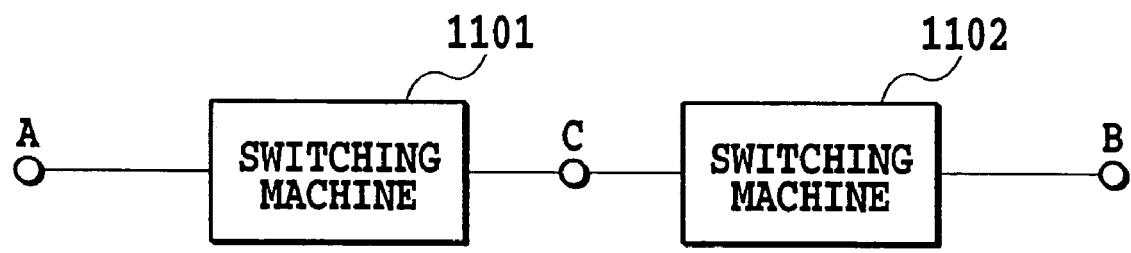
FIG. 11 is a block diagram illustrating an example in which a plurality of call loss factors are present.

FIG. 11 is a diagram showing a case where a plurality of call loss factors are present. When the blocking probabilities of switching machines 1101 and 1102 are p1 and p2, respectively, the blocking probability between A and B across the switching machines 1101 and 1102 is $1-(1-p1) \times (1-p2)$. Accordingly, assuming that the applied traffic intensity between AB is b, the modified applied traffic intensity b' between AB considering the call loss is expressed as $(1-(1-(1-p1) \times (1-p2))) \times b = ((1-p1) \times (1-p2)) \times b$. Incidentally, the modified applied traffic intensity between AC (that is, the applied traffic intensity to the switching machine 1101) and the modified applied traffic intensity between BC (that is, the applied traffic intensity to the switching machine 1102) are equal to the modified applied traffic intensity between AB.

Thus, the control is implemented by generating the dummy pd, by calculating the blocking probabilities p1 and p2 of the switching machines 1101 and 1102 from the modified applied traffic intensity $b'=(1-pd) \times b$, and by comparing an estimated value $C=1(1-p1) \times (1-p2)$ with the dummy pd to modify the dummy pd to match them.

Figure 12:
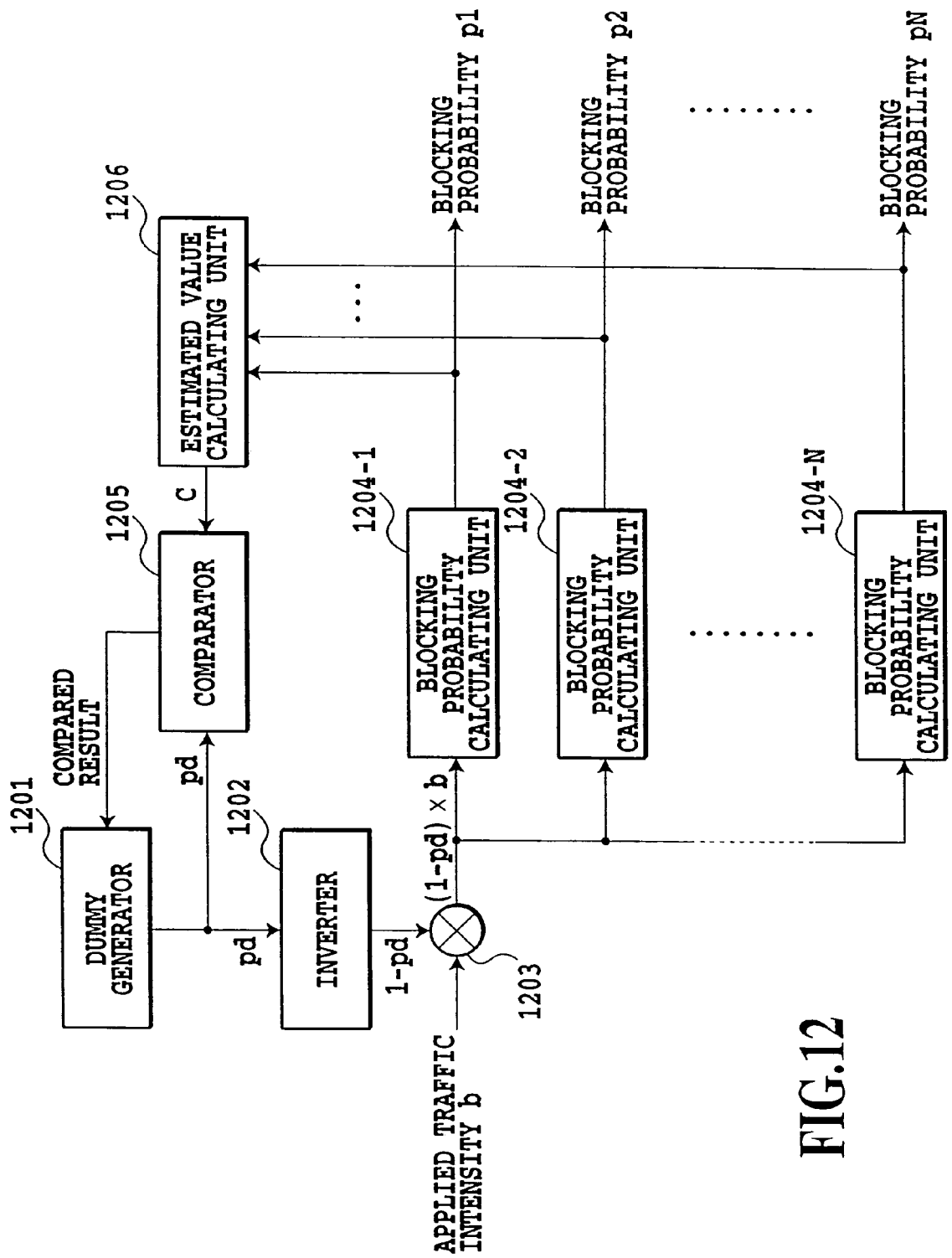
FIG. 12 is a block diagram illustrating functions of the blocking probability calculation apparatus of a third embodiment in accordance with the present invention.
Figure 13:
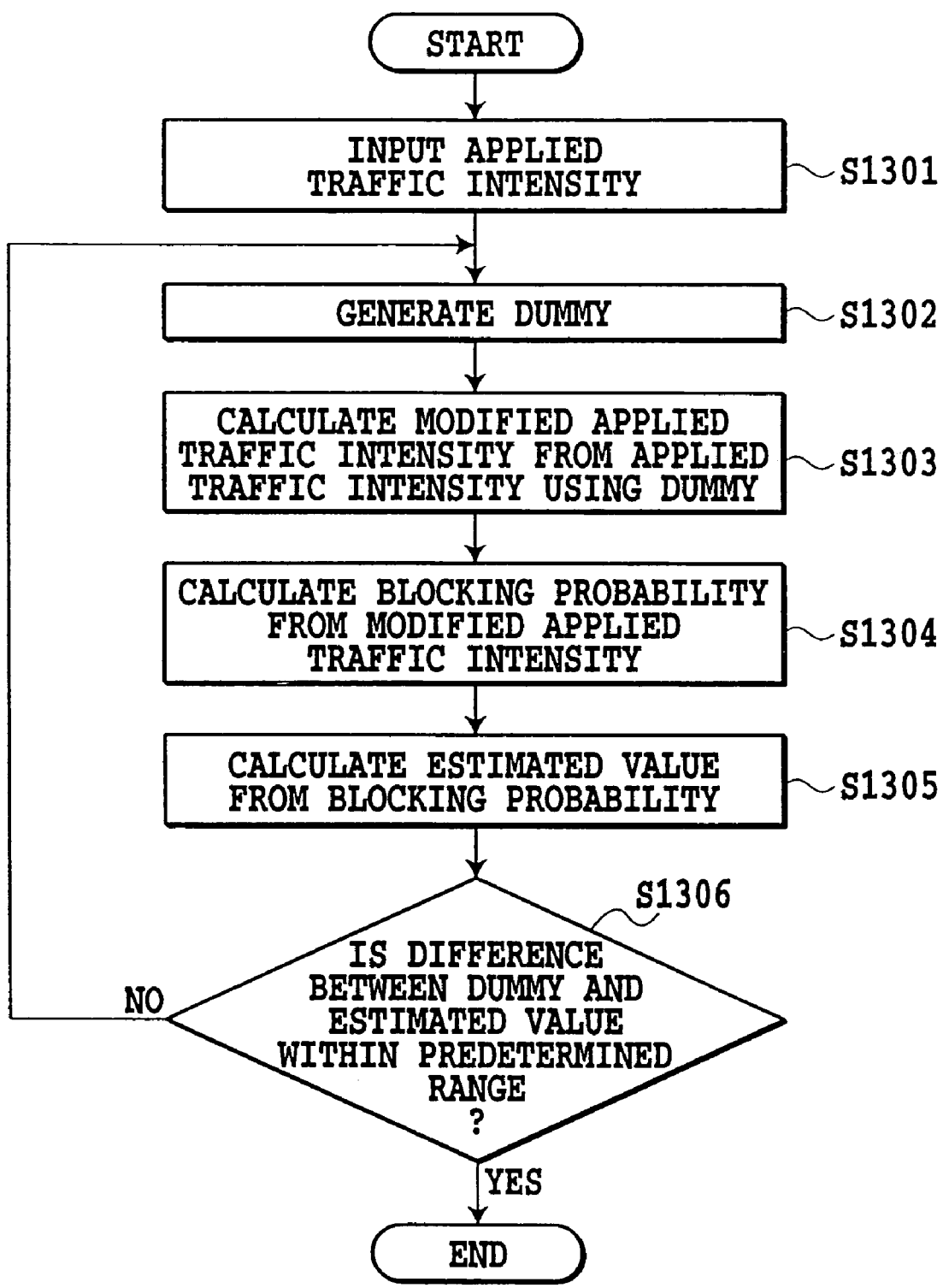
FIG. 13 is a flowchart illustrating a blocking probability calculation processing by the blocking probability calculation apparatus of the third embodiment.
Figure 14:
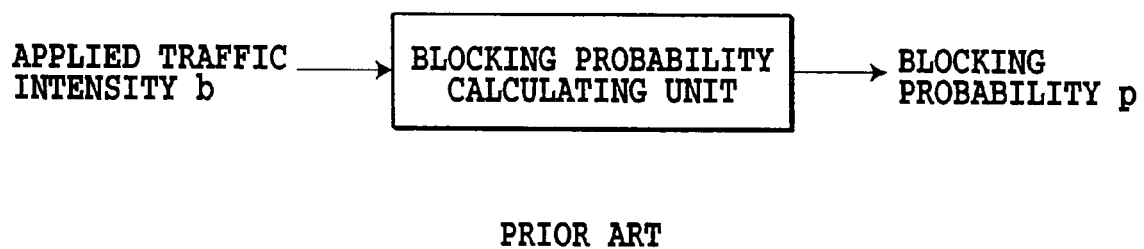
FIG. 14 is a block diagram illustrating a conventional blocking probability calculation technique.

FIG. 12 is a block diagram illustrating the functions of the blocking probability calculation apparatus of the present embodiment, and FIG. 13 is a flowchart illustrating a blocking probability calculation processing of the present embodiment.

The blocking probability calculation apparatus as shown in FIG. 12 comprises a dummy generator 1201, an inverter 1202, a multiplier 1203, blocking probability calculating units 1204-1-1204-N, a comparator 1205 and an estimated value calculating unit 1206.

In FIG. 13, steps S1301-S1303 correspond to steps S1001-S1003 in FIG. 10 of the second embodiment.

At step S1304, the blocking probability calculating units 1204-1-1204-N, where N is a natural number, calculate the blocking probabilities p1-pN from the modified applied traffic intensity $b'=(1-pd) \times b$. In the present embodiment, the blocking probabilities p1-pN are calculated using the method (formulae (1) and (2)) disclosed in the paper described above.

At step S1305, the estimated value calculating unit 1206 calculates the estimated value $C=1-(1-p1) \times (1-p2) \times \ldots \times (1-pN)$ from the calculated blocking probabilities p1-pN.

At step S1306, the comparator 905 compares the dummy pd with the estimated value C, and terminates the processing when the difference between the two is within a predetermined range, that is, when the two are considered to be equal, in which case, it is considered that the sufficiently accurate blocking probabilities p1-pN are obtained. The blocking probabilities p1-pN thus calculated are displayed on the display unit 805 as needed, and are output to the output unit 806.

When the difference between the dummy pd and the estimated value C exceeds the predetermined range, the processing is returned to step S1302 (step S1306). At step S1302, a new dummy pd is generated on the basis of the compared result of the dummy pd with the estimated value C. More specifically, a new dummy pd is made larger than the current pd if C>pd, and is made smaller than the current pd if C<pd.

After that, the processing from step S1302 to step S1305 is iterated until the difference between the dummy pd and the estimated value C falls within the predetermined range.

Thus, the simple and accurate calculation of the blocking probability in the mobile communication system can be implemented.

Although the blocking probability calculation processing of the present embodiment, that is, the processing by the dummy generator 1201, inverter 1202, multiplier 1203, blocking probability calculating units 1204-1-1204-N, comparator 1205 and the estimated value calculating unit 1206 is carried out by means of software (programs), it can be implemented by means of hardware. In addition, the program of the blocking probability calculation processing can be prestored in a floppy disk, CO-ROM or the like so that the program can be loaded onto a memory or hard disk before its execution.

Furthermore, although the applied traffic intensity is input as the load on the mobile communication system in the present embodiment, the interference power, the transmission power of the base station or the like can be input instead. In addition, although the calculation method disclosed in the paper described above is used for calculating the blocking probability, other calculation methods can be utilized.

Moreover, the present invention is applicable to any system such as a fixed telephone communication system and a mobile communication system using an FOMA, TOMA or COMA, as long as it allows a plurality of users to carry out communications with sharing the resources, offering similar advantages.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A blocking probability calculation method in a mobile communication system, said blocking probability calculation method comprising:

a load input step of inputting a load b on the mobile communication system;

a dummy generating step of generating a dummy Pd;

a modified load calculating step of calculating a modified load b' from the load b using the dummy Pd;

a blocking probability calculating step of calculating a blocking probability p from the modified load b', wherein said blocking probability calculating step calculates from the modified load b' a plurality of blocking probabilities p1, p2, . . . , pN, where N is a natural number greater than 2, wherein said dummy generating step compares the dummy pd with the blocking probability p, and generates a new dummy pd from a compared result; and an estimated value calculating step of calculating an estimated value C from the plurality of blocking probabilities p1, p2, . . . , pN, and wherein said dummy generating step compares the dummy pd with the estimated value C, and generates a new dummy pd from a compared result.

2. The blocking probability calculation method as claimed in claim 1, wherein said dummy generating step compares the dummy pd with the blocking probability p, makes the new dummy pd greater than the current dummy pd when p>pd, and makes the new dummy pd smaller than the current dummy pd when p>pd.

3. The blocking probability calculation method as claimed in claim 1, wherein said estimated value C equals $1-(1-p1)\times(1-p2)\times \ldots \times(1-pN)$, and wherein said dummy generating step compares the dummy pd with the estimated value C, makes the new dummy pd greater than the current dummy pd when C>pd, and makes the new dummy pd smaller than the current dummy pd when C<pd.

4. The blocking probability calculation method as claimed in claim 1, wherein the modified load b' equals $(1-pd)\times b$.

5. A computer readable recording medium storing a program causing a computer to execute a blocking probability calculation method in a mobile communication system, said blocking probability calculation method comprising:

a load input step of inputting a load b on the mobile communication system;

a dummy generating step of generating a dummy pd;

a modified load calculating step of calculating a modified load b' from the load b using the dummy pd;

a blocking probability calculating step of calculating a blocking probability p from the modified load b', wherein said blocking probability calculating step calculates from the modified load b' a plurality of blocking probabilities p1, p2, . . . , pN, where N is a natural number greater than 2, wherein said dummy generating step compares the dummy pd with the blocking probability p, and generates a new dummy pd from a compared result; and an estimated value calculating step of calculating an estimated value C from the plurality of blocking probabilities p1, p2, . . . , pN, and wherein said dummy generating step compares the dummy pd with the estimated value C, and generates a new dummy pd from a compared result.

6. A blocking probability calculation apparatus in a mobile communication system, said blocking probability calculation apparatus comprising:

load input means for inputting a load b on the mobile communication system;

dummy generating means for generating a dummy pd;

modified load calculating means for calculating a modified load b' from the load b using the dummy pd;

blocking probability calculating means for calculating a blocking probability p from the modified load b', wherein said blocking probability calculating means calculates from the modified load b' a plurality of blocking probabilities p1, p2, . . . , pN, where N is a natural number greater than two, wherein said dummy generating means compares the dummy pd with the blocking probability p, and generates a new dummy pd from a compared result; and an estimated value calculating means for calculating an estimated value C from the plurality of blocking probabilities p1, p2, . . ., pN, and wherein said dummy generating means compares the dummy pd with the estimated value C, and generates a new dummy pd from a compared result.

7. The blocking probability calculation apparatus as claimed in claim 6, wherein said dummy generating means compares the dummy pd with the blocking probability p, makes the new dummy pd greater than the current dummy pd when p>pd, and makes the new dummy pd smaller than the current dummy pd when p<pd.

8. The blocking probability calculation apparatus as claimed in claim 6, wherein said estimated value C equals $1-(1-p1)\times(1-p2)\times \ldots \times(1-pN)$, and wherein said dummy generating means compares the dummy pd with the estimated value C, makes the new dummy pd greater than the current dummy pd when C>pd, and makes the new dummy pd smaller than the current dummy pd when C<pd.

9. The blocking probability calculation apparatus as claimed in claim 6, wherein the modified load b' equals $(1-pd)\times b$.

* * * * *